United States Patent Office 2,959,475
Patented Nov. 8, 1960

2,959,475

METHOD FOR THE CONTROL OF WEEDS

Raymond W. Luckenbaugh, Wilmington, Del., assignor to E. I. du Pont de Nemours and Company, Wilmington, Del., a corporation of Delaware No Drawing. Filed Feb. 19, 1957, Ser. No. 641,009

1 Claim. (Cl. 71—2.5)

This invention relates to herbicidal compositions and methods employing certain phenyl and substituted phenyl alkylbarbituric acid derivatives as active ingredients.

The compounds that have been found to possess outstanding herbicidal activity are those barbituric acids and salts represented by the following formula:

(1)

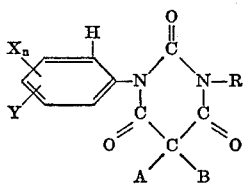

and the salts thereof, wherein X and Y can be the same or different and are hydrogen, halogen, or alkyl group of less than 5 carbon atoms, provided, however, that when X is halogen Y can be nitro;

$n$ is a positive integer of less than 4, that is 1, 2 or 3;

R is an alkyl group containing less than 5 carbon atoms, and preferably methyl;

A is hydrogen, halogen, an alkyl group of less than 5 carbon atoms, or a cation; and B is hydrogen, halogen, or an alkyl group of less than 5 carbon atoms.

As is well known, barbituric acid compounds of this type exist in both the ketone and enol tautomeric forms. The salts of course are predominantly in the enol form.

While all of the barbituric acid salts represented by the above formula appear to possess herbicidal activity, the better salts utilized in the herbicidal compositions and methods of the present invention are the alkali metal and alkaline earth metal salts, preferably sodium, potassium and calcium salts.

The compounds of Formula 1 are characterized by outstanding herbicidal activity. When applied at appropriate dosages, they are effective in controlling both broadleaf weeds and grasses. They can be used as soil sterilants and also as post- and pre-emergence herbicides. Certain of these compounds have been found to exhibit relatively high selectivity, having pronounced effect on broadleaf weeds.

The substituted barbituric acid derivatives used in the practice of the present invention can be prepared by any conventional means. Thus, the compounds of Formula 1, except those where A or B is halogen, can be prepared by reacting equimolar amounts of appropriately substituted phenyl alkyl urea and malonic acid by warming the substituted urea and the malonic acid or alkyl substituted malonic acid with acetic anhydride. A homogeneous reaction mixture is obtained, after which the excess acetic anhydride is removed by low pressure distillation. The residue is taken up in water and the substituted barbituric acid separates as either an oil or solid.

These substituted barbituric acid derivatives can also be obtained by the reaction of the dialkyl ester of the malonic acid with the substituted urea, in which case sodium ethoxide is used in place of acetic anhydride and the product is isolated by dilution with water and acidification of the reaction mixture.

Those compounds of Formula 1 having A and/or B equal to halogen can be synthesized by treating the corresponding 5-unsubstituted or 5-monoalkyl substituted barbituric acid derivative with the appropriate amount of the desired halogen in glacial acetic acid.

In order to form the salts of the compounds represented by Formula 1, the 5-position of these barbituric acid derivatives must have one hydrogen substitutent. This is necessary since the salts are formed by reaction of an equimolar amount of the metal hydroxide with an enol form of the barbituric acid derivative in aqueous solution. The salts are then isolated by evaporation of the solution to dryness.

In use these compounds can be applied to areas to be protected from undesirable vegetation in any of a variety of compositions. Thus, those that are sufficiently water-soluble can be applied simply as water solutions. It is preferred, however, that the compounds be extended with a carrier material or conditioning agent of the kind used and commonly referred to in the art as a herbicidal adjuvant or modifier. Such adjuvants are inert solids, surface-active agents and organic liquids.

The compounds shown above will be included in such compositions in sufficient amount so that they can exert a herbicidal effect. Usually from about 1 to 95% by weight of the compounds are included in such formulations.

Solid formulations can be prepared with inert powders. The formulations thus can be homogeneous powders that either can be used as such, diluted with inert solids to form dusts, or suspended in a suitable liquid medium for spray application. The powders usually comprise active ingredient admixed with minor amounts of conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. The active ingredient usually makes up from about 25–90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

If the active compound used is water soluble, it can be sprayed or in any other desired manner applied to an absorptive powder which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, diesel oil, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The compounds can be applied in compositions of the types shown in Jones U.S. Patent 2,412,510 in which an active compound of the invention replaces the active materials of that patent in the composition shown and in like amounts. Similarly, any of the carriers, additives or surface-active agents there named or referred to can be used.

The herbicidal method of the present invention comprises applying a substituted barbituric acid of Formula 1, ordinarily in a herbicidal composition of the aforementioned type, to the locus or area to be protected from undesirable plant growth. The active compound is, of course, applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, complete control of vegetation is obtained at rates of about 40–100 lbs./acre of the active ingredient. Application at rates of about 1 to 20 lbs./acre of the active ingredient for pre-emergence or early post-emergence treatment gives excellent control of broadleaf weeds and grasses in hardy crop plants such as corn and cotton. When applied to established perennial grasses at rates of about 2 to 10 lbs./acre, good control of germinating broadleaf weeds and crabgrass is obtained with minimum injury to the mature grasses.

In order that the invention can be better understood, the following examples are given in addition to those set forth above:

*Example 1*

A mixture consisting of 7.18 parts of 1-(3,4-dichlorophenyl)-3-methylbarbituric acid in 100 parts of 0.25 N aqueous sodium hydroxide is heated at 90° for a few minutes, then evaporated to dryness under reduced pressure to give 7.0 parts of the sodium salt of 1-(3,4-dichlorophenyl)-3-methylbarbituric acid.

*Examples 2 thru 5*

The following salts are prepared in accordance with the procedure of Example 1 by substituting molecular equivalent amounts of the appropriate barbituric acid for the barbituric acid employed in Example 1, and using 0.25 N aqueous base solutions of the appropriate alkali or alkaline earth metal base.

| Example | |
|---|---|
| 2 | 1-(p-chlorophenyl)-3-ethylbarbituric acid, potassium salt. |
| 3 | 1-(5-bromo-2-methylphenyl)-3,5-dimethylbarbituric acid, calcium salt. |
| 4 | 5-chloro-1-ethyl-3-phenylbarbituric acid, sodium salt. |
| 5 | 5-butyl-1-(3,4-dichlorophenyl)-3-methylbarbituric acid, sodium salt. |

*Example 6*

The following wettable powder herbicidal compositions are prepared by the conventional technique of blending the active ingredient with the inert powder carrier, the wetting agent and the dispersant, and then grinding the mixture in an impact mill to an average particle size below about 50 microns, followed by reblending of the resultant powder until it is completely homogeneous.

A | Percent
---|---
1-(3,4-dichlorophenyl)-3-methylbarbituric acid | 80
Alkyl naphthalene sodium sulfonate | 1.0
Methyl cellulose (low viscosity) | 0.25
Attapulgite | 18.75

B
5,5-dibromo-1-butyl-3-phenylbarbituric acid | 80
Alkyl naphthalene sodium sulfonate | 1.0
Methyl cellulose (low viscosity) | 0.25
Attapulgite | 18.75

C
5,5-dichloro-1-methyl-3-phenylbarbituric acid | 75
Fine particled synthetic silica | 23.5
Oleyl ester of sodium isethionate | 1.0
Naphthalene sulfonic acid-formaldehyde condensation product, sodium salt | 0.5

D
1-(p-chlorophenyl)-3-ethylbarbituric acid, potassium salt | 80
Alkyl naphthalene sodium sulfonate | 1.0
Methyl cellulose (low viscosity) | 0.25
Attapulgite | 18.75

E
1-(3,4-dichlorophenyl)-3-methylbarbituric acid, sodium salt | 50
Sodium "Lorol" sulfate | 0.75
Sodium lignin sulfonate | 1.00
Kaolin clay | 48.25

F
1-methyl-3-phenyl-5-propylbarbituric acid | 50
Sodium "Lorol" sulfate | 0.75
Sodium lignin sulfonate | 1.0
Kaolin clay | 48.25

Compositions A, B, and D when applied as a pre-emergence treatment in 80 gallons of water at a rate of 8 lbs. of active ingredient per acre give excellent control of broadleaf weeds in corn.

Compositions E and F when applied at a rate of 80 lbs. of active ingredient per acre in 250 gallons of water give complete control of vegetation around power stations throughout the growing season.

Composition C when applied at a rate of 70 lbs. of active ingredient per acre in 200 gallons of water gives good control of broadleaf and grassy weeds growing in lumber yards.

*Example 7*

The following pellet compositions are prepared by first micropulverizing and blending, then moistening with 10–15% water and extruding under pressure to form pellets. These pellets, when dried, are suitable for convenient application by hand.

A | Percent
---|---
5-bromo-1-methyl-3-phenyl-5-propylbarbituric acid | 25
Hydrated attapulgite | 59
Alkyl aryl sodium sulfonate | 1
Anhydrous sodium sulfate | 15

B
1-(5-bromo-2-methylphenyl)-3,5-dimethylbarbituric acid, calcium salt | 25
Hydrated attapulgite | 74
Alkyl aryl sodium sulfonate | 1

These pellet compositions, when applied at the rate of 400 lbs./acre, give good control of broadleaf and grassy weeds growing in forest fire lanes.

Example 8

The following granular composition is prepared by first micropulverizing the active ingredient, suspending it in excess water with the gum arabic and mixing it with the vermiculite in a spray blender. When dry, the active ingredient is firmly attached and evenly distributed through the vermiculite to yield a free-flowing, granular composition suitable for application with a fertilizer spreader.

A

| | Percent |
|---|---|
| 5,5 - dibromo - 1 - (2,4 - dichlorophenyl) - 3 - propylbarbituric acid | 10 |
| Ground vermiculite (No. 4 granules) | 85 |
| Gum arabic | 5 |

Example 9

The following aqueous dispersion compositions are prepared by mixing together and wet milling the listed ingredients with high shear in a pebble mill until the particle size is below 5 microns in diameter. The resulting aqueous dispersions are stable against settling and can be diluted with water before spraying.

A

| | Percent |
|---|---|
| 5 - butyl - 5 - chloro - 1 - ethyl - 3 - (2,4,5 - trichlorophenyl)-barbituric acid | 40 |
| Bentonite clay | 2 |
| Sodium lignin sulfonate | 5 |
| Water | 53 |

B

| | |
|---|---|
| 1 - (3,4 - dichlorophenyl) - 3 - methylbarbituric acid | 30 |
| Hydrated attapulgite | 3 |
| Sodium lignin sulfonate | 15 |
| Water | 51.2 |
| Disodium phosphate | 0.8 |

Composition A, when applied at the rate of 8 lbs. of active ingredient per acre in 100 gallons of water as a post-emergence treatment to established perennial grasses including orchard grass and brome grass, gives pre-emergence control of germinating broadleaf weeds with minimum injury to established grasses.

Composition B, when applied to established blue-grass turf at a rate of 8 lbs. of active ingredient per acre in 80 gallons of water, gives pre-emergence control of crabgrass and broadleaf weeds without substantial injury to the mature grass.

Example 10

The following dust herbicidal compositions are prepared by first blending together the active ingredient and the minor diluent and micropulverizing to an average particle size less than 50 microns. This mixture is then blended with the major diluent to yield a composition suitable for application with standard dusting equipment.

A

| | Percent |
|---|---|
| 5,5 - diethyl - 1 - methyl - 3 - phenylbarbituric acid | 15 |
| Diatomaceous silica | 15 |
| Pyrophyllite | 70 |

B

| | |
|---|---|
| 1-methyl-3-phenylbarbituric acid | 10 |
| Attapulgite | 10 |
| Micaceous talc | 80 |

C

| | |
|---|---|
| 5 - ethyl - 1 - methyl - 3 - phenyl - 5 - propylbarbituric acid | 20 |
| Kaolin clay | 20 |
| Tobacco dust | 60 |

D

| | |
|---|---|
| 5 - chloro - 1 - ethyl - 3 - phenylbarbituric acid, sodium salt | 15 |
| Diatomaceous silica | 15 |
| Pyrophyllite | 70 |

These compositions, when applied at the rate of 100 lbs./acre of active ingredient using standard dusting equipment, give excellent control of broadleaf and grassy weeds around telephone and power-line poles.

Example 11

The following oil compositions are prepared by mixing the components in a ball mill and grinding until the average particle size of the active material is below about 5 microns.

A

| | Percent |
|---|---|
| 5 - bromo - 1 - (2 - chloro - 4 - methylphenyl) - 3-methylbarbituric acid | 30 |
| Diesel oil | 70 |

B

| | |
|---|---|
| 5 - butyl - 1 - (3,4 - dichlorophenyl) - 3 - methylbarbituric acid sodium salt | 30 |
| Diesel oil | 70 |

These compositions are applied at a rate of 70 lbs./acre of active ingredient after extending with sufficient diesel oil to make a total application of 150 gallons of formulation per acre as a post-emergence treatment, giving excellent control of a heavy infestation of grassy and broadleaf weeds along railroad rights-of-way.

Additional compounds which can be used in the compositions and methods as described above are as follows:

1-(p-bromophenyl)-3-methylbarbituric acid
1-(p-chlorophenyl)-3-methylbarbituric acid
1-(m-chlorophenyl)-3-methylbarbituric acid
1-(2,4,5-trichlorophenyl)-3-methylbarbituric acid
1-(m-tolyl)-3-methylbarbituric acid
1-(p-tolyl)-3-methylbarbituric acid
1-(p-cumyl)-3-methylbarbituric acid
1-(3-chloro-4-methylphenyl)-3-methylbarbituric acid
1-(4-chloro-3-nitrophenyl)-3-methylbarbituric acid
1-(p-chlorophenyl)-3-methylbarbituric acid, sodium salt
1-(p-cumyl)-3-methylbarbituric acid, sodium salt
1-(4-chloro-3-nitrophenyl)-3-methylbarbituric acid, sodium salt

I claim:

The method for the control of weeds comprising applying to the locus to be treated, in a herbicidally effective amount, a compound represented by the formula

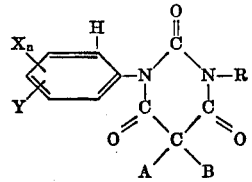

wherein X is selected from the group consisting of hydrogen, chlorine, bromine, and alkyl groups containing less than 5 carbon atoms;

Y is selected from the group consisting of hydrogen, chlorine, bromine, alkyl groups containing less than 5 carbon atoms, and nitro, with the proviso that Y is nitro only when X is halogen;

$n$ is a positive integer less than 4;

R is an alkyl group of less than 5 carbon atoms;
A is selected from the group consisting of hydrogen, chlorine, bromine, alkyl groups of less than 5 carbon atoms, alkali metals and alkaline earth metals; and
B is selected from the group consisting of hydrogen, chlorine, bromine, and alkyl groups of less than 5 carbon atoms.

References Cited in the file of this patent

Hepner et al.: in "Berichte Der Deutsche Chemische Gesellschaft," vol. 65, pages 123 to 126, 1932.

Doskocil: in "Chemical Abstracts," vol. 44, col. 10054(i) (1950).

King: in "Agricultural Handbook," U.S. Department of Agriculture, No. 69, page 56 (1954).